Dec. 14, 1965 G. H. McLAFFERTY 3,223,591
GASEOUS REACTOR CONTAINER
Filed Aug. 27, 1962 3 Sheets-Sheet 1

INVENTOR
GEORGE H. McLAFFERTY
BY *[signature]*
ATTORNEY

Dec. 14, 1965   G. H. McLAFFERTY   3,223,591
GASEOUS REACTOR CONTAINER
Filed Aug. 27, 1962   3 Sheets-Sheet 3

INVENTOR
GEORGE H. McLAFFERTY
BY Leonard F. Weklind
ATTORNEY

United States Patent Office 3,223,591
Patented Dec. 14, 1965

3,223,591
GASEOUS REACTOR CONTAINER
George H. McLafferty, Manchester, Conn., assignor to United Aircraft Corporation, East Hartford, Conn., a corporation of Delaware
Filed Aug. 27, 1962, Ser. No. 219,378
2 Claims. (Cl. 176—52)

This invention relates to nuclear reactors and more particularly to a nuclear energy conversion system in which thermal radiation rather than convection is employed as the primary means of heat transfer.

In ordinary reactors in which convection is relied upon for the transfer of heat energy from the heat source to the working fluid, a substantial pressure drop in the working fluid is an inherent requirement. This requires structures of considerable weight in order to withstand the normal stresses involved. The device described herein can be made relatively light and extremely efficient while avoiding the penalties of undue weight.

It is an object of this invention to provide an energy conversion system which relies primarily on thermal radiation to obtain a useable source of heat energy.

It is a further object of this invention to utilize a nuclear fuel source properly contained such that thermal radiation is the primary form of heat transfer.

These and other objects of this invention will become readily apparent from the following detailed description of the drawings in which.

Figure 1:
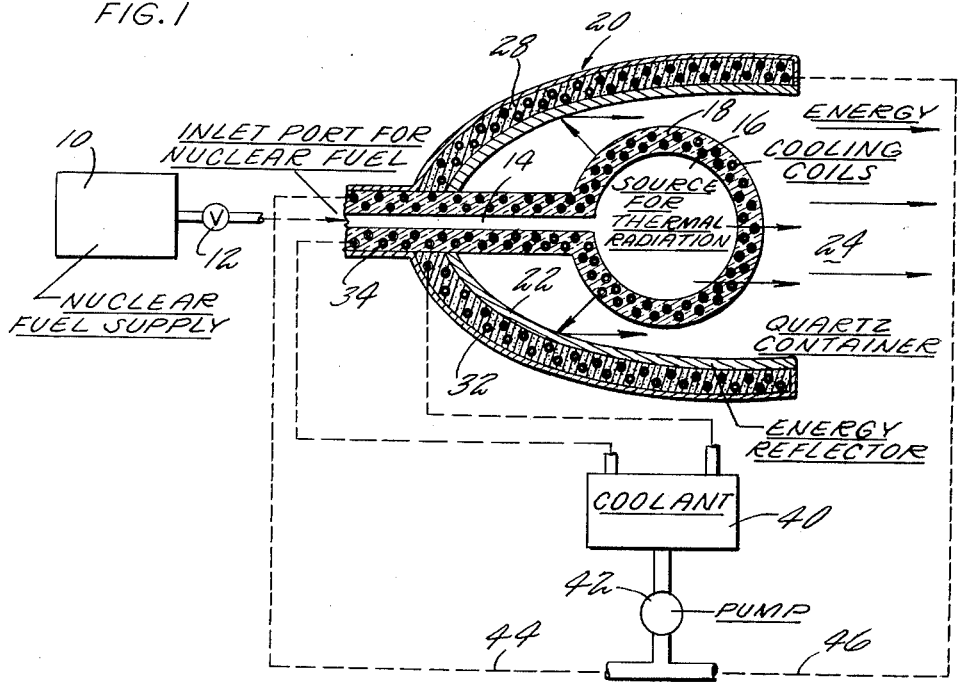
FIG. 1 is a schematic illustration of a nuclear heat source with an energy reflector.

Referring to FIG. 1, a nuclear fuel supply 10 is conducted through a valve 12 through a cooling passage 14 into a cavity 16. The cavity 16 is formed by a container 18 made of a material such as quartz which is transparent to thermal radiation. Some of the other materials which might be employed are fused silica, sapphire, calcium fluoride and lithium fluoride. It is known that quartz for example is transparent up to 99.9% for radiation having wave lengths between .19 and 3.15 microns. One micron is equal to $10^{-4}$ cm. For blackbody radiation from a surface at 20,000 R., 93% of the radiated energy is contained between these wave lengths. Even more efficiency can be obtained by seeding the nuclear fuel with a substance which will absorb the wave lengths of light which may be absorbed by the quartz, thereby reducing the heat flux to the latter.

The quartz container 18 may be surrounded by a reflector body, generally indicated at 20. This body includes an inner reflector liner 22 which will cause the energy of thermal radiation to pass in at least some confined or focused form through the exit opening 24. Moderator means for the nuclear reaction may be formed integrally as at 28 in the outer body 20 or in another adjacent location. Cooling coils 32 and 34 may be provided in the outer body 20 or in the inner container 18. The coolant may be supplied from a suitable source 40 via a circulating pump 42 and through the lines 44 and 46.

The energy flux from the proposed device is extremely high. For instance, for a gas temperature of 20,000 R., the radiant energy is approximately 80 mw. per sq. ft. It may be possible to employ gas temperatures higher than 20,000 R. and, hence, increase the radiant energy transferred above 80 mw. per sq. ft.

Figure 2:
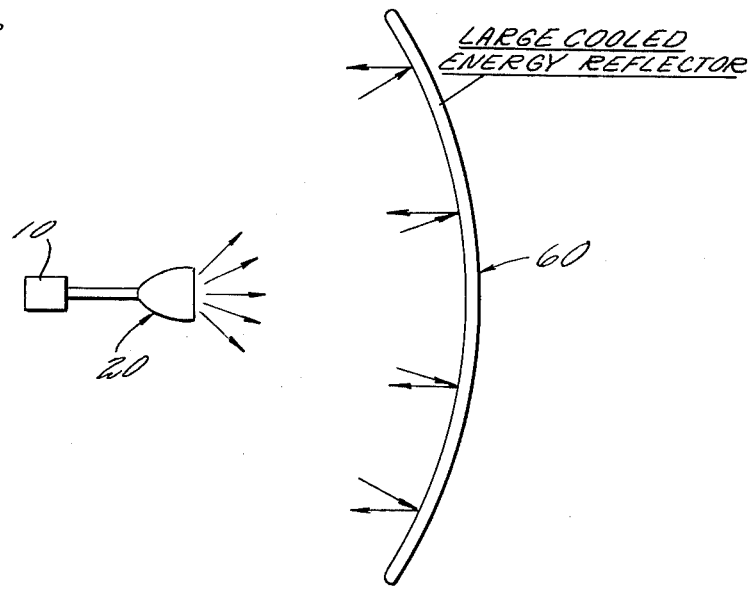
FIG. 2 is a schematic illustration of the energy source of FIG. 1, utilized with a focusing reflector.

As seen in FIG. 2, the radiator body 20 is schematically illustrated along with its nuclear fuel source 10. The radiant energy is transmitted to a relatively large reflector 60 which may be parabolic in shape, so that it can focus the thermal energy at a remote point. Such transmitted energy may be used for many processes requiring large quantities of heat or radiant energy.

Figure 3:
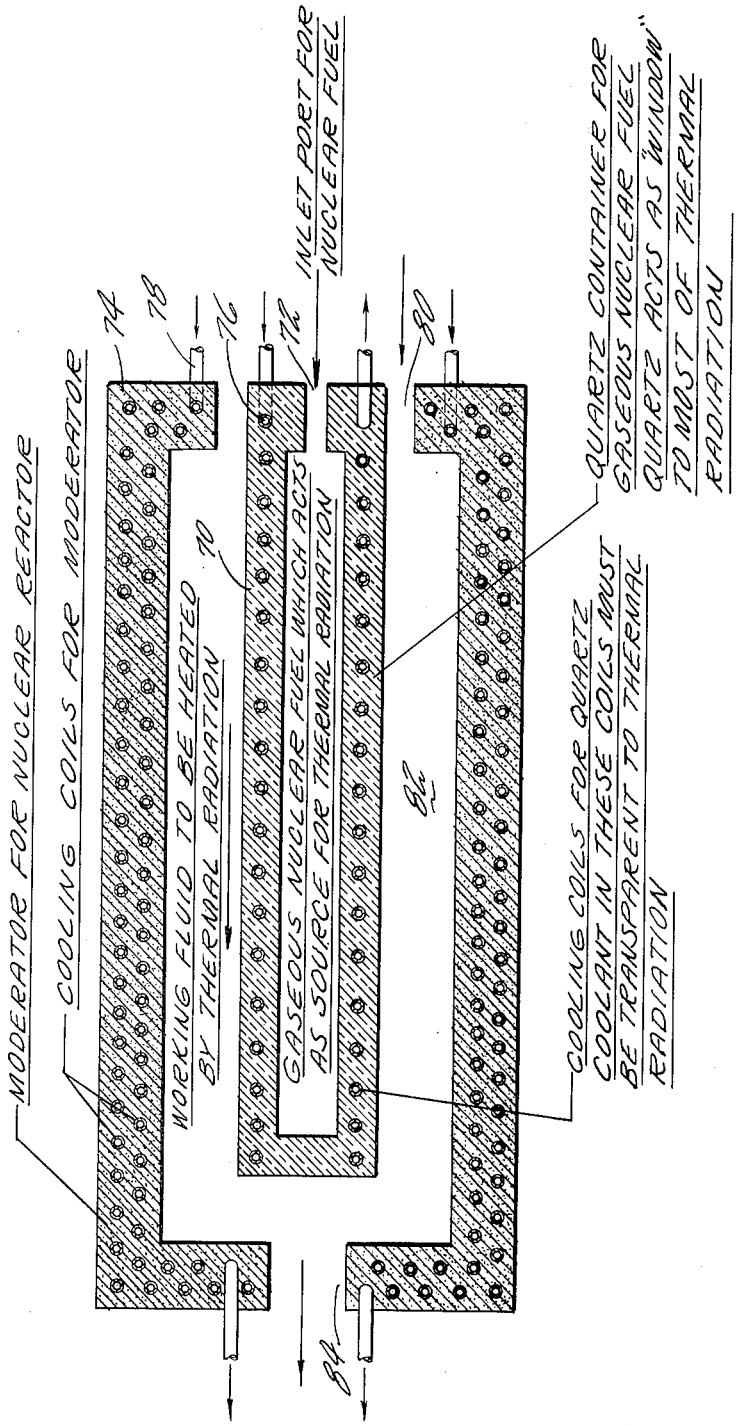
FIG. 3 is a modified arrangement whereby a working fluid is heated by thermal radiation.

FIG. 3 is a modified arrangement of a thermal energy conversion unit. Thus, as shown therein, a quartz-like container 70 may receive a nuclear fuel via inlet port 72. An outer container 74 may contain the usual moderator while cooling coils 76 and 78 may be provided in both inner and outer containers, respectively. A working fluid may enter through the annular passage 80 whereafter it is heated in the main annular chamber 82 by radiant energy passing through the quartz-like inner body 70. The heated working fluid may then pass through the outlet 84 where it may be utilized to provide the hot gases for a rocket exhaust nozzle, to drive a turbine or MHD generator, or other similar devices.

Some heat would be transferred by conduction from the gaseous nuclear fuel to the transparent wall. However, calculations have indicated that the conduction of heat to the wall can be less than one percent of the heat radiated through the wall. In order to insure that turbulence in the gaseous nuclear fuel would not increase the conduction to the quartz, it might be desirable to slowly rotate the quartz tube or the fluid within the quartz tube to set up stabilizing density gradients in the nuclear fuel.

As a result of this invention, it is apparent that this type of device could be utilized wherever nuclear heat is required, such as in thermodynamic cycles using turbines or MHD generators or in process heaters, air-breathing aircraft or rockets.

Figure 4:
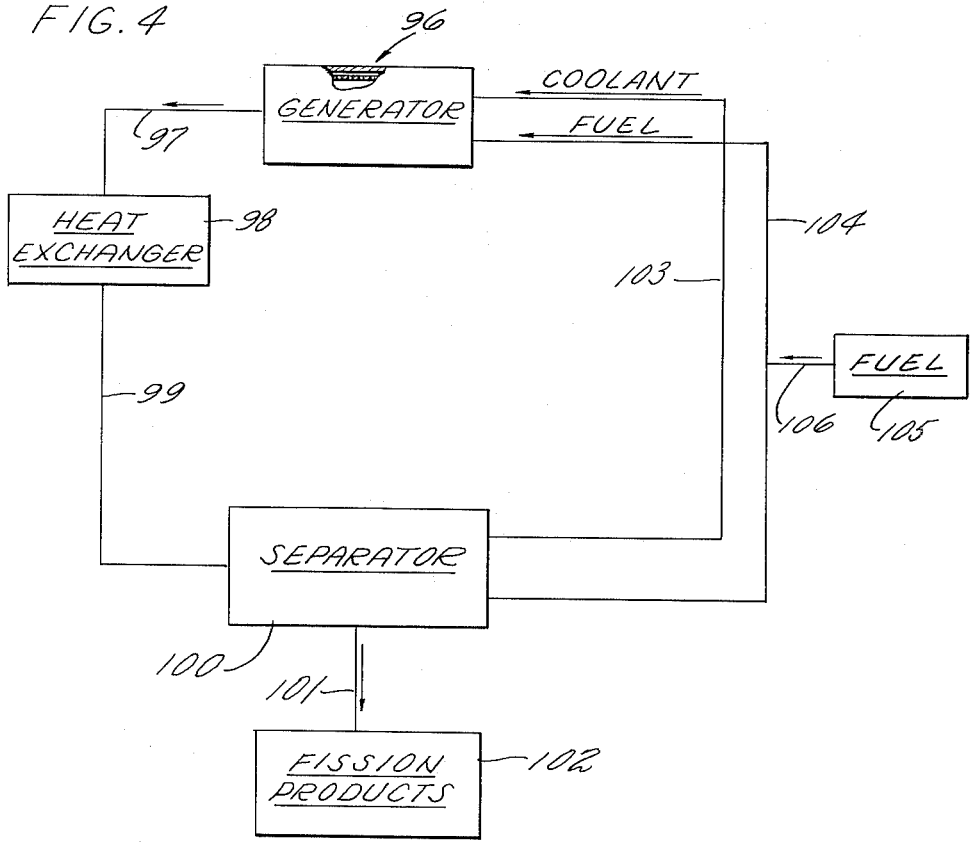
FIGS. 4 and 5 illustrate an alternate arrangement of the basic device.
Figure 5:
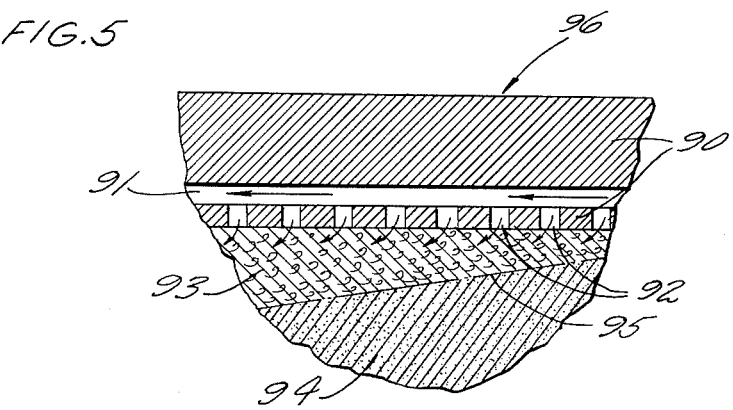

An alternate system for cooling the transparent walls of the proposed device which is different from the system shown in FIGS. 1 and 3 is shown in FIGS. 4 and 5. In this alternate system the transparent wall 90 corresponds to the transparent wall 18 in FIG. 1 or the transparent wall 70 in FIG. 3. The transparent coolant fluid 91 in FIG. 5 is injected through ports 92 which lead to the interior or fissionable gas region of the proposed device. This coolant then forms into a cold layer 93 which is separated from the hot nuclear fuel 94 by a gas interface 95. The use of the film cooling arrangement shown in FIG. 5 would reduce the heating of the transparent wall and permit an increase in the radiating temperature of the fissionable gas 94.

FIG. 5 is an enlargement of the region generally indicated at 96 in FIG. 4. FIG. 4 is a schematic drawing of the ducting which would be required for use with the film cooling scheme outlined in FIG. 5. The mixture of coolant gas and fissonable gas which would be created by diffusion across the gas interface 95, along with any fission products created, would be ducted from the transparent walled container through a passage 97 to a heat exchanger 98. Once the mixture of coolant, gaseous nuclear fuel, and fission products was cooled in the heat exchanger 98, it would be ducted through passage 99 to a separator 100. The separator, which could conceivably operate on the principle of fractional condensation of constituents, would cause the fuel, coolant, and fission products to be separated and sent off into three separate ducts. The fission products would be ducted through passage 101 to a storage container 102 where they would be permitted to decay until they could be transported to some far-off area for disposal. The coolant would be ducted through passage 103 back to cool the transparent walls of the proposed device. The nuclear fuel would be ducted through passage 104 back into the fuel region in the proposed device. The fuel which was burned would be replaced by fuel from a container 105 leading through a duct 106 into passage 104.

The film cooling scheme shown in FIG. 4 and 5 would be more complex than the cooling scheme for the transparent wall shown in FIGS. 1 and 3. However, the permissible temperatures in the nuclear fuel and the resulting radiant heat flux would be much greater for the cooling scheme shown in FIGS. 4 and 5 than for the cooling scheme shown in FIGS. 1 and 3. Studies have indicated that the quantity of heat which would be required to be removed from the heat exchanger 98 would be a small percentage of the heat radiated through transparent wall 90 in FIG. 5.

Although several embodiments of this invention have been illustrated and described herein, it will become apparent that various changes and modifications may be made in the construction and arrangement of the various parts without departing from the scope of this novel concept.

I claim:

1. An energy transformation device comprising a container having an inlet, means for conducting a fluid nuclear fuel within said container through said inlet, moderator means spaced externally and adjacent said container for inducing a nuclear reaction in said nuclear fuel and producing high temperature and thermal radiation, said container having walls of a material which is substantially transparent to thermal radiation, a focussing reflector means externally of said container and spaced therefrom for receiving said thermal radiation and reflecting the energy created thereby to a point remote from said container, and means for cooling said container and said reflecting means.

2. An energy transformation device comprising a container having an inlet, means for conducting fluid nuclear fuel within said container through said inlet, moderator-reflector means adjacent said container for inducing a nuclear reaction in said nuclear fuel to produce high temperatures and thermal radiation, said container having walls of a material of the group consisting of quartz, fused silica, sapphire, calcium fluoride and lithium fluoride which is substantially transparent to thermal radiation, means for cooling the walls of said container, said moderator-reflector means being external of said container and spaced therefrom and with said container forming a working passage, means for cooling said last-mentioned means, means for conducting a working fluid through said working passage whereby said working fluid is heated by said thermal radiation, and means for conducting said working fluid from said passage.

References Cited by the Examiner

UNITED STATES PATENTS

| 2,408,867 | 10/1946 | McCollum | 165—133 X |
| 2,731,242 | 1/1956 | Borg et al. | 165—133 X |
| 3,039,948 | 6/1962 | Krucoff | 176—37 |
| 3,054,738 | 9/1962 | Hermans et al. | 176—37 |
| 3,085,957 | 4/1963 | Natland | 176—27 |
| 3,115,194 | 12/1963 | Adams | 262—1 X |

OTHER REFERENCES

Astronautics, October 1959, pp. 20–27, 46, 48, 50.
Missiles and Rockets, June 13, 1960, pp. 29, 32. 33.

REUBEN EPSTEIN, *Primary Examiner.*

CARL D. QUARFORTH, *Examiner.*